United States Patent [19]

Jiskoot

[11] Patent Number: 4,697,645
[45] Date of Patent: Oct. 6, 1987

[54] DISC CULTIVATOR SHIELD

[76] Inventor: Sidney G. Jiskoot, R. R., Sanborn, Iowa 51248

[21] Appl. No.: 820,026

[22] Filed: Jan. 21, 1986

[51] Int. Cl.⁴ .............................................. A01B 39/26
[52] U.S. Cl. ..................................... 172/510; 172/517
[58] Field of Search ............... 172/508, 509, 510, 513, 172/517, 156, 512, 511, 81

[56] References Cited

U.S. PATENT DOCUMENTS

| | | | |
|---|---|---|---|
| 698,624 | 4/1902 | Bates | 172/510 |
| 1,111,967 | 9/1914 | Meeker | 172/513 |
| 1,495,113 | 5/1924 | Schneider | 172/513 |
| 1,766,164 | 6/1930 | Allen | 172/513 |
| 1,810,052 | 6/1931 | Mader | 172/517 X |
| 2,959,231 | 11/1960 | Heilman | 172/512 |
| 4,213,505 | 7/1980 | Jolley | 172/510 |
| 4,552,225 | 11/1985 | Behn | 172/513 |

Primary Examiner—Richard J. Johnson
Attorney, Agent, or Firm—David C. Larson

[57] ABSTRACT

A disc cultivator shield which cooperates with standard disc cultivators to protect young corn plants during disc cultivating is provided. The preferred embodiment is adaptable to various disc cultivators and serves to guide the corn plants in between the discs of the disc cultivator and prevents the discs from rolling over the leaves of the corn plant and partially burying the plant. The disc cultivator shield is specifically designed for windy days when corn plants tend to be blown over, and it is removable to allow standard disc cultivating on calm days if desired.

2 Claims, 3 Drawing Figures

DISC CULTIVATOR SHIELD

BACKGROUND OF THE INVENTION

The present invention relates generally to row crop cultivation and more particularly to a shield unit for mounting on a standard disc cultivator which guides the plants in the field being cultivated away from being run over by the disc cultivator.

Those in the agricultural industry concerned with the growing of crops and particularly with the cultivating of the field have long been aquainted with the problems encountered when trying to cultivate a field on a windy day. Typically, a disc cultivator will be used to cultivate a corn field when the young corn plants are approximately 2 to 12 inches high. When the young corn plants are at this fragile stage, the stocks are not yet sufficiently developed to withstand wind gusts in excess of 15 miles per hour, and they will lean in the wind with a pronounced oscillation in the direction of the wind. When this condition exists, the agriculturalist is faced with a decision of either delaying cultivation and thereby loosing valuable time, or cultivating in the windy conditions and partially burying a substantial number of the young plants thereby endangering production. This dilemma is particularly accute in the Midwest where many row corps are grown and Spring and Summer winds tend to blow quite high across the plains.

In the past, various disc cultivators have been developed which protect young plants from being covered by stones and clods which may be cast up by cultivator blades, but they have done little towards protecting against wind damage during the cultivating process. For the typical agriculturalist, time is an extremely important factor, and the loss of work days due to adverse weather conditions can severely affect the crop yield. The majority of farmers do not have sufficient man power or equipment to cultivate their entire planting on ideal weather condition days, and with the high cost of farm equipment, the farmer must either gamble that there will be a sufficient number of good working days for cultivation in the growing year, or be prepared to be in the fields under less than ideal conditions.

The world wide food shortages, as well as the already high cost of food production has rapidly increased the need for improved crop production methods. The small scale farmer as well as the large corporate farm have a need for equipment which increases the amount of time that can be spent in the fields without endangering the yield.

SUMMARY OF THE INVENTION

Accordingly, the present invention provides a shield unit for use on a standard disc cultivator, which allows an agriculturalist to spend additional time in the field during adverse weather conditions without risk of increased damage to crop production.

An object of the present invention is to provide a shield for a standard disc cultivator which allows cultivation on windy days without excessive damage due to buried leaves or plants.

Another object is to provide an adjustable and removeable shield for use with various disc cultivators when desired.

A further object of the invention is to provide a shield which adapts to and cooperates with existing equipment owned by the farmer.

Still another object is to provide a simple, inexpensive and light weight shield for use in disc cultivating.

Yet another object is to provide a shield for use with disc cultivators which does not require the farmer to alter the operating procedure for his existing equipment.

Other objects, advantages and novel features of the present invention will become apparent from the following detailed description of the invention when considered in conjunction with the accompanying drawings.

DESCRIPTION OF THE PREFERRED EMBODIMENT

Figure 1:
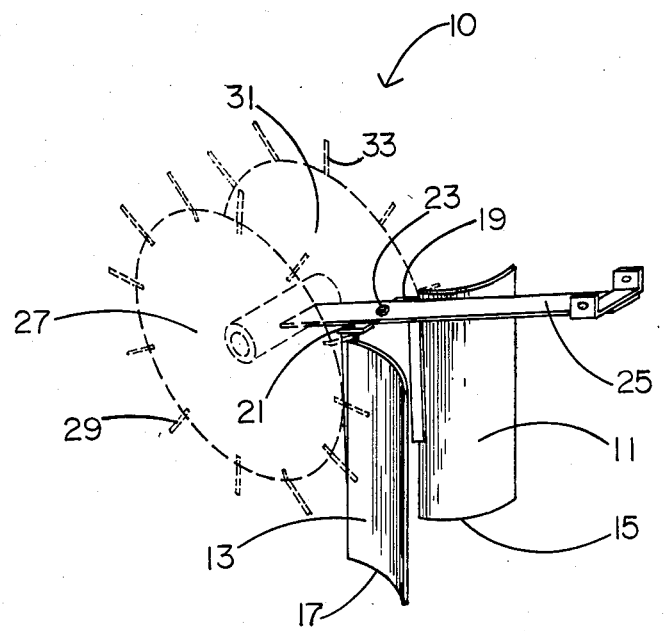
FIG. 1 is a perspective view showing the disc cultivator shield of the present invention attached to a standard disc cultivator (shown in phantom lines).
Figure 2:
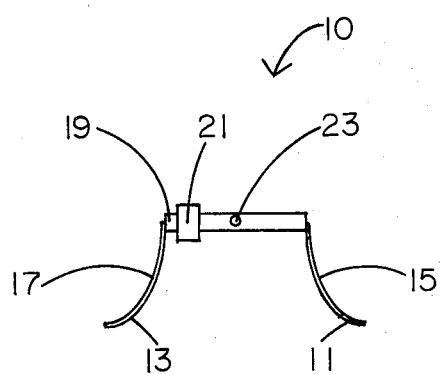
FIG. 2 is a top view of the disc cultivator shield.

Referring now to the drawings wherein like reference numerals designate identical or corresponding parts throughout the several views, FIG. 1 shows the disc cultivator shield of the present invention in solid lines indicated generally at 10. The disc cultivator shield 10 includes a first shield 11, and a second shield 13, adjustably mounted on a "U" shaped mounting bar 19.

The first shield bottom edge 15 and the second shield bottom edge 17 are curved outward to provide a wider opening at the entrance to the disc cultivator shield 10. It is understood that a straight first shield 11 and straight second shield 13 could be mounted on the mounting bar 19 in a flared manner to similarly provide an enlarged opening at the front of the disc cultivator shield 10.

Figure 3:
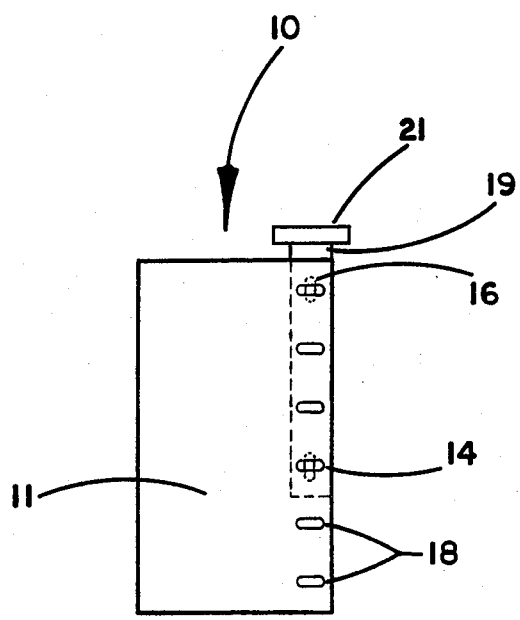
FIG. 3 is a side view of the disc cultivator shield.

The first shield 11 and second shield 13 can be permanently mounted on the mounting bar 19 for continued use with a known style of disc cultivator, or they can be adjustably mounted for adaptation to different styles of disc cultivators. As can best be seen in FIG. 3, the first shield 11 and second shield 13 can be adjustably mounted by placing horizontally elongated apertures 18 in a vertical line extending along the trailing edge of the first shield 11 and second shield 13 corresponding to vertically elongated aperture 16 and aperture 14 located in a vertical line down the center of the sides of the "U" shaped mounting bar 19. Through the use of two threaded fasteners on each of the shields 11 and 13, the shields 11 and 13 can be adjusted upwards and downwards, as well as inwards and outwards in relation to the mounting bar 19.

Centered on the top of the "U" shaped mounting bar 19 is a mounting aperture 23. In use, the "U" shaped mounting bar 19 with the first shield 11 and the second shield 13 attached to it is set upright near the front side of a standard disc cultivator. The tongue 25 is then rotated down on top of the "U" shaped mounting bar 19 and a threaded fastener is inserted through bolt aperture 23 and through one of a line of apertures (not shown) as typically occurs on standard disc cultivator tongues 25. Standard disc cultivators typically have a first disc 31 and second disc 27 with first disc fingers 33 and second disc fingers attached thereto. Depending upon the particular size of the disc cultivator, aperture 23 can be aligned with the appropriate aperture on the tongue 25, and then tightened into place with a threaded fastener. When the disc cultivator shield is properly installed, a guide tab 21 will be in contact with the edge of the tongue 25 to properly align the disc cultivator shield 10 and prevent the disc cultivator shield 10 from displaying unwanted rotation characteristics in relation to the disc cultivator on which it is mounted. Various other mounting means for affixing the mounting bar 19 to the tongue 25 such as welding, clamping, or other means, as well known in the art, would be equally as acceptable, so long as the disc cultivator shield 10 is restricted from movement in relation to the tongue 25 during the cultivation process.

It is understood that the top of the "U" shaped mounting bar 19 can have telescoping characteristics as well known in the art, to allow a width adjustment to accomodate different widths occuring on disc cultivators. Although not shown for simplicity, the guide tab 21 can be slideably mounted on the mounting bar 19 with locking elements such as threaded fasteners or friction locks, as well known in the art, in order to adjust for varying widths of tongues 25 on disc cultivators.

In use, the disc cultivator shield 10 will be aligned with first disc 31 and second disc 27 of a standard disc cultivator, with the trailing edge of the disc cultivator shield 10 located slightly in front of the first disc 31 and second disc 27 and inside of the disc fingers 33 and 29. The first shield bottom 15 and second shield bottom 17, when properly positioned, will be at approximately the same elevation as the bottom edge of the first disc 31 and second disc 27.

As best shown in FIG. 1, due to the flared construction of the disc cultivator shield 10, when the disc cultivator shield 10 is attached to a standard disc cultivator and pulled behind a draft vehicle, the crops being cultivated will be guided away from under the disc fingers 33 and 29 and into the area between first disc 31 and second disc 27.

I claim:

1. A disc cultivator shield comprising:
   a dual disc cultivator, said discs being rotatably supported in laterally spaced relation on an axle;
   a tongue attached to and extending outward from the axle of the dual disc cultivator;
   mounting bracket means rigidly attached to and extending downwardly from opposite sides of the tongue;
   a first vertically extending shield adjustably attached to one side of the mounting means positioned adjacent the forward edge of said disc; and
   a second shield adjustably attached to the other side of the mounting means for cooperating with the first shield to funnel growing crops between said discs and away from passing underneath the discs during the cultivation process.

2. A disc cultivator shield comprising:
   a dual disc cultivator, said discs being rotatably supported in laterally spaced relation on an axle;
   a tongue attached to and extending outward from the axle of the dual disc cultivator;
   an inverted "U" shaped mounting bracket with an elongated aperture located near the top of each of the two sides thereof, and a single aperture centered near the bottom of each of the two sides;
   fastening means for rigidly attaching the mounting bracket to and extending downwardly from opposite sides of the tongue;
   a first vertically extending shield with horizonally elongated apertures located in a vertical line extending along the rear edge of the shield;
   a second vertically extending shield with horizontally elongated apertures located in a vertical line extending along the rear edge of the shield; and
   a plurality of fasteners for affixing the first and second shields to the mounting bracket.

* * * * *